United States Patent [19]
Wise

[11] Patent Number: 5,163,717
[45] Date of Patent: Nov. 17, 1992

[54] PIPE COUPLER

[75] Inventor: John Wise, Hamilton, Ohio

[73] Assignee: Advanced Drainage Systems, Inc., Columbus, Ohio

[21] Appl. No.: 603,066

[22] Filed: Oct. 25, 1990

[51] Int. Cl.[5] ............................................. F16L 21/08
[52] U.S. Cl. ..................................... 285/236; 285/903
[58] Field of Search ............... 285/903, 419, 236, 235, 285/369

[56] References Cited

U.S. PATENT DOCUMENTS

| | | | |
|---|---|---|---|
| 3,239,254 | 3/1966 | Campbell | 285/903 X |
| 3,753,287 | 8/1973 | Ziemek et al. | 285/903 X |
| 3,938,834 | 2/1976 | Oostenbrink | 285/235 |
| 4,141,576 | 2/1979 | Lupke et al. | 285/903 X |
| 4,149,740 | 4/1979 | Hall | 285/903 X |
| 4,229,028 | 10/1980 | Gray | 285/235 |
| 4,443,031 | 4/1984 | Borsh et al. | 285/903 X |
| 4,674,074 | 3/1987 | Pate et al. | 285/903 X |
| 4,795,197 | 1/1989 | Kaminski et al. | 285/903 X |
| 4,871,198 | 10/1989 | Hattori et al. | 285/903 X |
| 4,913,473 | 4/1990 | Bonnema et al. | 285/903 X |
| 5,006,376 | 4/1991 | Arima et al. | 285/235 X |

FOREIGN PATENT DOCUMENTS 1080305  8/1967  United Kingdom ............... 285/235

*Primary Examiner*—Dave W. Arola
*Attorney, Agent, or Firm*—Biebel & French

[57] ABSTRACT

A coupler for use with pipe is disclosed having a unitary tubular structure with an inner and an outer surface. The inner surface has at least one and preferably three interiorly depending ribs. The outer surface is preferably corrugated and has formed therein a plurality of valleys. The inner surface also has a plurality of valleys formed therein which may have associated therewith pressure beads. The inner surface valleys are disposed between adjacent interiorly depending ribs. The coupler preferably has its tubular structure encircled with means for clamping the coupler more tightly to a pipe. Also disclosed is the combination of the coupler securing adjacent pieces of corrugated double-wall plastic pipe to one another.

12 Claims, 5 Drawing Sheets

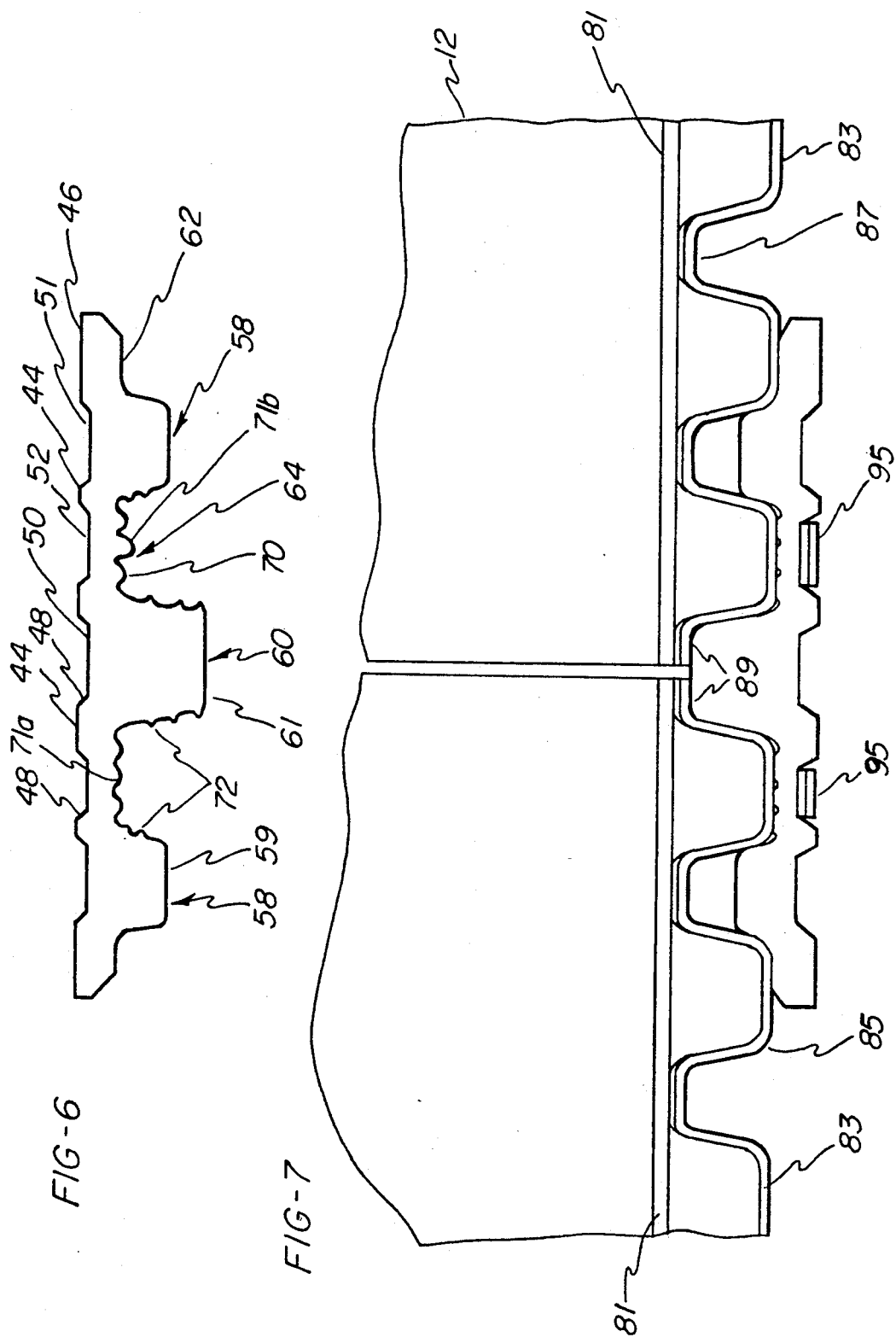

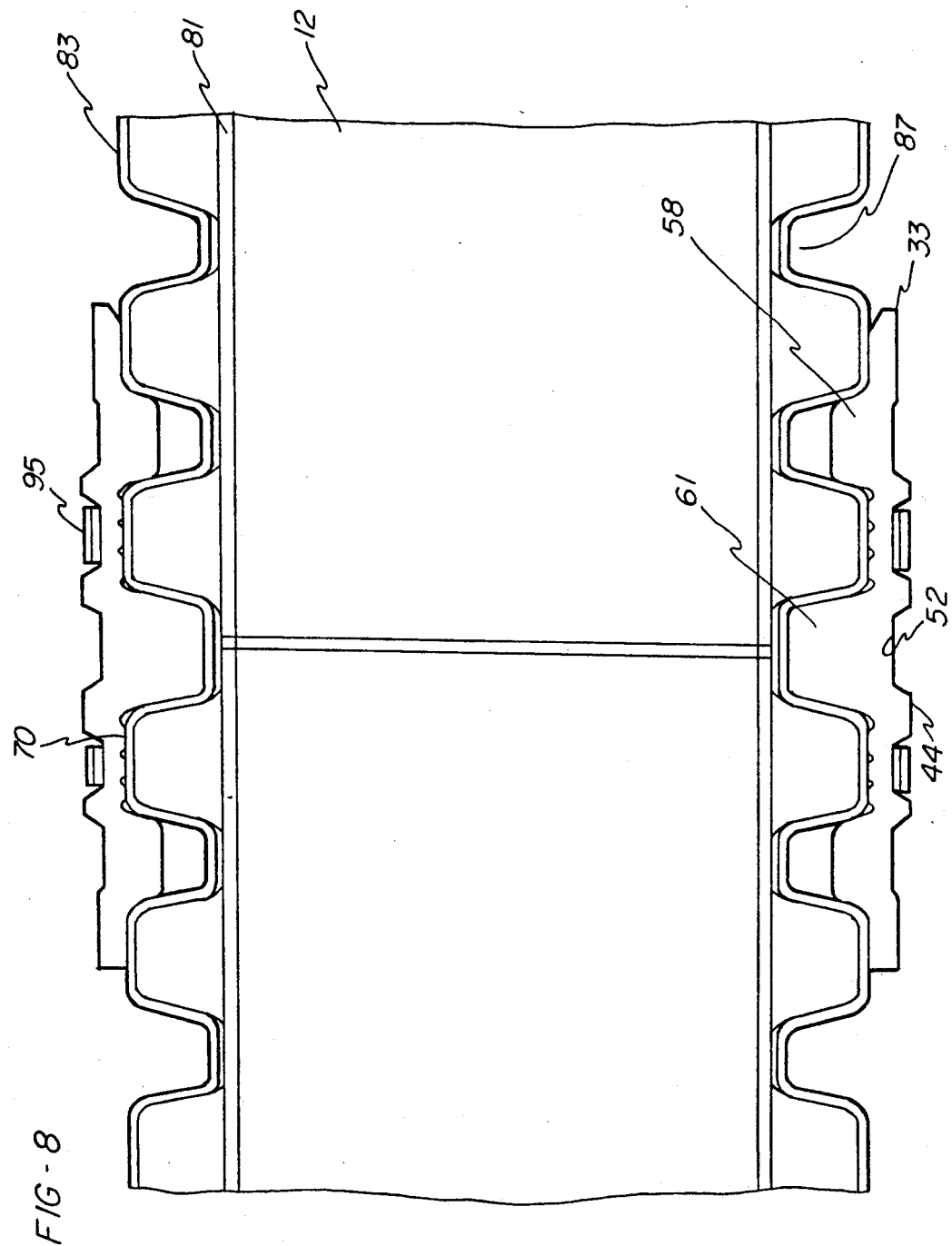

PIPE COUPLER

FIELD OF THE INVENTION

This invention relates to a coupler for use with pipe, and more particularly to a flexible coupler for use in the installation of double-wall plastic pipe in applications where no leakage is desired or where pressure due to pumping or positive head is present.

BACKGROUND OF THE INVENTION

This invention is directed to the providing of a coupler for use with pipe designed to be utilized in connection with the providing of adequate drainage or passage of a liquid through such pipe. The use of coupling units or couplers per se is not new. Normally couplers fabricated from material similar to the pipe are used to hold adjacent sections of pipe together and provide an adequate seal. With respect to most prior art plastic pipe, including pipe known as double-wall pipe, the providing of a liquid impervious seal relative to the adjacent pipe sections is not of extreme importance even in drainage applications, since there is no substantial pressure in the line. However, where the nature of use for the pipe requires that sanitary sewage pass therethrough, or where pressure on the liquid carried through the pipe is present due to the pumping of the liquid or to a condition known as positive head, a condition which exists when the quantity of liquid within the pipe renders it almost full, it is desirable if not necessary that no leakage occur.

Couplers are known in the prior art associated with pipe used in the aforementioned applications. A typical type of coupler involves a polyethylene wrap secured about the adjacent ends of pipe by a fastener. These split-couplers normally require an overlap, such that a gap between the interior surface of the coupler and the exterior surface of the pipe is invariably present. Even if a gasket is placed between the adjacent pieces of pipe, installation in conjunction with the wrapped coupler may still result in a leak. This is especially the case when the pressure increases inside the pipe, as well as when the earth experiences shifts, since the force of the earth tends to break the wrapped coupler's seal as inwardly directed pressure on the pipe is changed.

It is thus apparent that the need exists for an improved coupler for pipe which provides for an effective seal similar to the invention.

SUMMARY OF THE INVENTION

In accordance with this invention a coupling device for use with pipe is provided for use preferably with double-wall drainage pipe, and more preferably for use with such pipe in applications where there are concerns concerning leakage either into or out of the pipe. The coupler is preferably formed of a flexible material such as rubber, or a flexible PVC having an elastomer in it, such that the coupler is both abrasion resistant, as well as flexible.

The unitary, tubular structure of the coupler is formed having at least one inwardly projecting rib, and preferably formed with at least three such ribs. The ribs may be identical in size, or the centermost rib may be slightly wider and taller than the adjacent ribs. Between each of the ribs is a groove which may either be smooth or have formed thereon a plurality of pressure beads. These pressure beads may all be of the same size, or the one or ones nearest the center of the groove may be slightly larger. Furthermore, the pressure beads may also be formed on the sides of the ribs.

The outer surface of the coupler may be smooth, but preferably is formed with a series of corrugations, such that a strap may be secured within the corrugation about the pipe. The coupler has its dimensions configured such that the interiorly depending ribs extend into the valleys of the corrugated pipe to which it is to be coupled. Similarly, the outwardly projecting components of the corrugated pipe extend into the valleys associated with the coupler. Preferably direct contact is made between the base of the valleys and the outermost surface of the pipe.

In one embodiment of the invention, the fastening means secured about the pipe are oriented such that they align with the area where direct contact is being made. In an alternative embodiment of the invention, the straps are secured so as to correspond with those portions of the coupler which extend into the grooves associated with the corrugated pipe. These means for clamping permit the coupler to be secured more tightly to adjacent sections of pipe.

The primary objected of this invention is to provide a coupler for use with plastic pipe, which coupler is of extremely economical construction and is particularly easy to utilize in the laying of pipe. Important aspects of this objective are the fabricating of a coupler which produce an acceptable seal against leakage, which seal remains intact despite shifting of the pipe and variations of pressure on the outer surface of such pipe.

Another important objective is the fabrication of a coupler which provides for a uniform seal.

Another objective of this invention is to provide a pipe and coupler combination which eliminates the concern associated where pipes utilize gaskets as well as couplers in an attempt to prevent leakage.

Other objects and advantages of the invention will be apparent from the following description, the accompanying drawings, and the appended claims.

BRIEF DESCRIPTION OF THE DRAWINGS

FIG. 6 is a vertical sectional view on a greatly enlarged scale taken along line 6—6 of FIG. 5.

FIG. 7 is a schematic view showing adjacent pieces of pipe joined using the present invention prior to the clamping means being tightened about the pipe.

FIG. 8 is a schematic view similar to FIG. 7 showing the invention upon tightening of the clamping means.

DETAILED DESCRIPTION OF THE DRAWINGS

Figure 1:
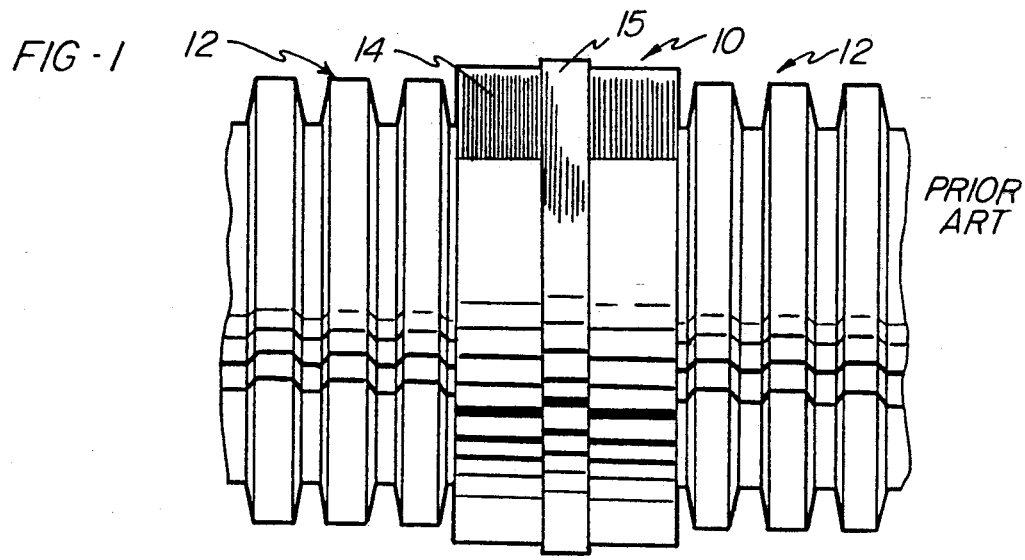
FIG. 1 is front elevational view of the coupler associated with the prior art, which prior art coupler is disclosed as joining two pieces of pipe together.
Figure 2:
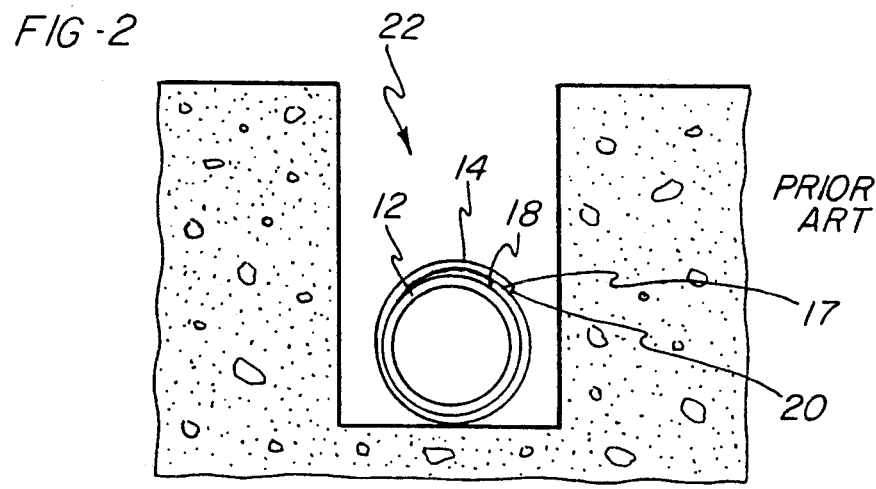
FIG. 2 is a schematic view associated with the prior art installed in operative relationship to drain pipe immediately after the pipe has been laid.
Figure 3:
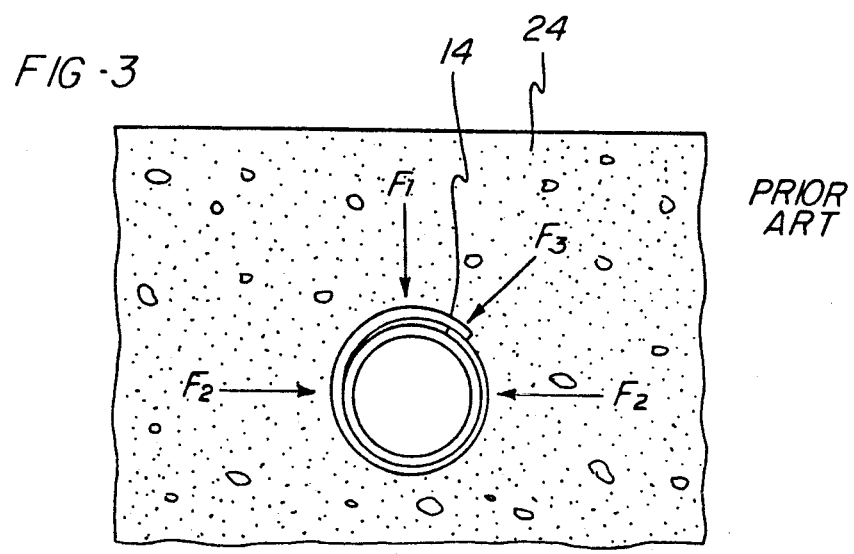
FIG. 3 is a schematic view showing pipe associated with prior art couplers subsequent to the time when the pipe has been laid.

Having reference to the drawings, attention is directed first to FIGS. 1, 2 and 3 which illustrate a prior art pipe coupler. As can be seen in FIG. 1, the prior art coupler designated generally by the numeral 10 was installed so as to join adjacent sections of corrugated pipe 12, with this corrugated pipe 12 typically being of the dual-wall type used in many drainage applications. The prior art coupler 10 was comprised of a wrapping 14 which could be formed of polyethylene or another bendable sheet form structure and a band fastener 15. The band fastener was often aligned so as to be superposed relative to the space between the pipes so that when the fastener was secured about the corrugated pipe 12, the sealing which occurred at the juncture of the two pipe sections was as complete as it could be.

As shown in FIG. 2, the prior art split-couplers typically enclosed the pipe 12 such that there was an area of overlap 17, where the first wrapping end 18 overlaid the second wrapping end 20. The wrapped coupler associated with the prior art had the area of overlap 17 typically on the side or the top portion of the pipe as it lay in trench 22 within ground 24, as shown.

Once the pipe had been coupled together, FIG. 3 discloses the various forces which exerted themselves on the pipe and the split coupler of the prior art. The dirt and other substances in the ground 24 when the trench was filled in initially exerted a downward force F-1 on the top of the pipe, which force could cause slight deformation in the pipe as well as put a pressure on the area of overlap. Over time, the settling of the pipe in the ground and the subjection of the pipe to lateral shifts caused by movement of the surrounding ground could cause forces F-2 to impact the pipe and the split coupler. A third force F-3 impacts directly on the area of overlap 17 and may force the first wrapping end 18 and second wrapping end 20 to move in opposite directions with respect to one another, thereby weakening the seal.

Over time and in combination, these three distinct forces may cause a seal which initially leaked very little if at all, to experience frequent and/or substantial leakage. In instances where sanitary sewage is involved, this necessitates the digging up of an area in order to replace the seal and to deal with the odor of leached sewage. Even more problems are created in situations where double-walled corrugated pipe is used for the passage therethrough of toxic or hazardous materials or waste. The presence of a leak in that situation can necessitate a costly environmental cleanup operation to deal not only with the broken seal, but also with the contaminated ground.

Figure 4:
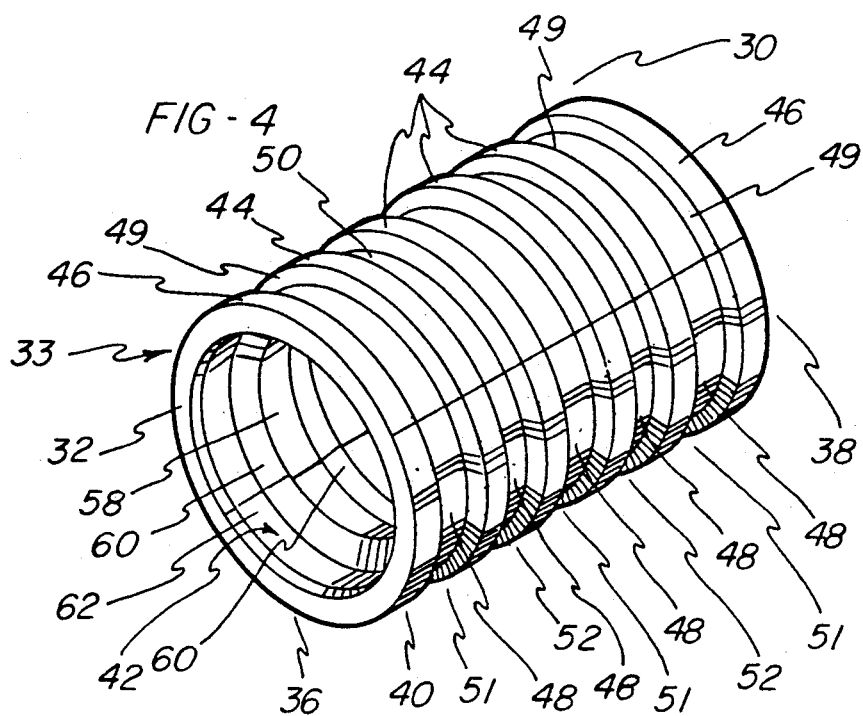
FIG. 4 is a perspective view of a coupler in accordance with the present invention.

FIG. 4 illustrates a unitary coupling device embodying this invention designated generally by the numeral 30. As can be seen in the drawings, the coupler 30 is comprised of a flexible housing 32 which may be fabricated from substances such rubber, or flexible PVC having therein an elastomer. The coupler of this invention could be fabricated from extruded rubber then vulcanized, or it could be injection molded. The coupler of this invention can thus be formed so as to be both flexible as well as abrasion resistant. The coupler 30 has tapered end portions 33, which serve as openings to an interior passage 34, through which passage the corrugated pipe 12 is passed.

The coupler 30 preferably is formed of a unitary, tubular and preferably cylindrical configuration having first end 36 and a second end 38 associated with the tapered end portions 33 on opposite ends of the flexible housing 32. The coupler 30 has an outer surface 40 and an inner surface 42. Associated with the outer surface 40 are a plurality of outer surface ribs 44 having at their outermost edges outer surface end portions 46. The outer surface ribs 44 are spaced apart from adjacent outer surface ribs 44 by outer surface valleys 48, such that the preferable outer surface configuration is corrugated with approximately the same dimensions associated with the width of the outer surface ribs 44 and outer surface valleys 48 as are associated with the ribs and valleys of pipe 12. The outer surface ribs 44 also have outer surface valley side walls 49 which incline between outer surface end portions 46 and outer surface valley bases 50.

The various outer surface valleys 48 may be all of the same width, or they may have a valley first width 51 and valley second width 52, so as to more easily accommodate clamping means used in combination with the coupler and adjacent sections of pipe.

Figure 5:
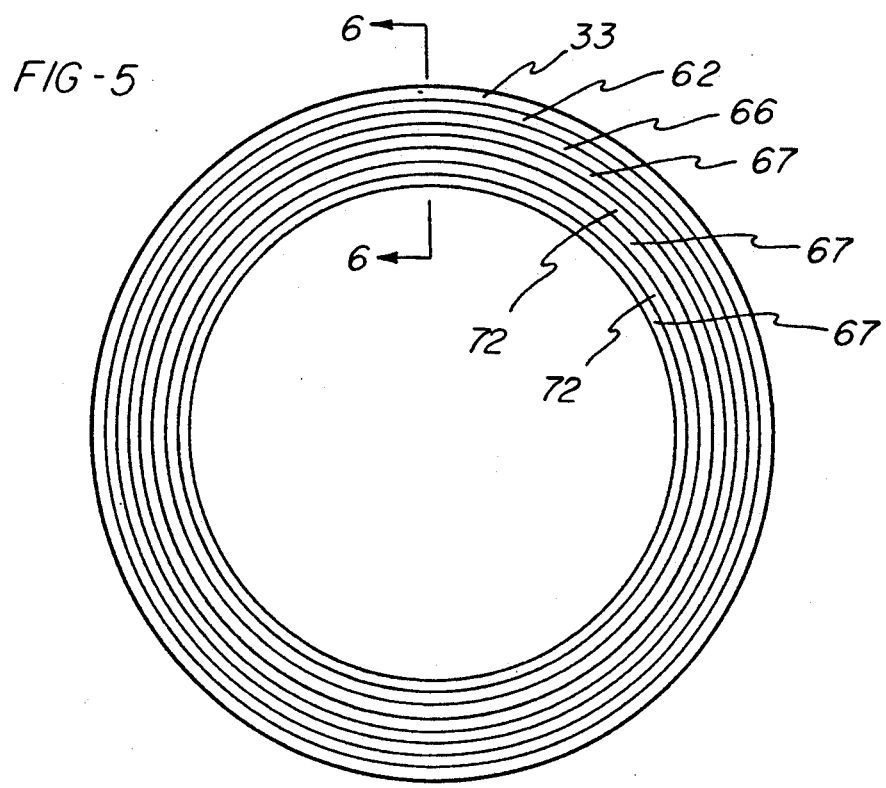
FIG. 5 is an end elevational view taken from the front of FIG. 4.

As can be seen in FIGS. 4, 5 and 6, the coupler 30 is formed with at least one and preferably at least three inner surface ribs which interiorly depend from the inner surface. As can be best appreciated in FIG. 6, there may be a rib first width 59 associated with the interiorly depending ribs 58, but more preferably the center-most rib 60, which also is known as a spacer, preferably has associated with it a rib second width 61. This width is slightly greater than rib first width 59 and serves the purpose of providing an effective seal against the corrugated pipe surface, even if the pipe when cut is cut off center with respect to adjacent corrugations.

Adjacent the tapered end portion 33 is an inner surface end portion 62 which extends inwardly from the tapered end portion 33 towards the inner surface ribs 58. Disposed between adjacent inner surface ribs 58 are inner surface valleys 64. Inner surface rib side walls 66 incline upwardly from the inner surface valley 64 and inner surface end portion 62 to those inner wall ribs other than center rib 60. Center rib side walls 67 incline upwardly from the inner surface valley 64 to the inner surface rib top surface 68 associated with the center rib 60.

Pressure beads 70 are associated with the inner surface valleys 64, with these pressure beads either having the same size as shown by 71a, or having a larger sized center bead as shown by 71b. Additionally, the side walls associated with the center rib 60, as well as the other interiorly depending ribs 58 ma have formed thereon side wall pressure beads 72.

Figure 9:
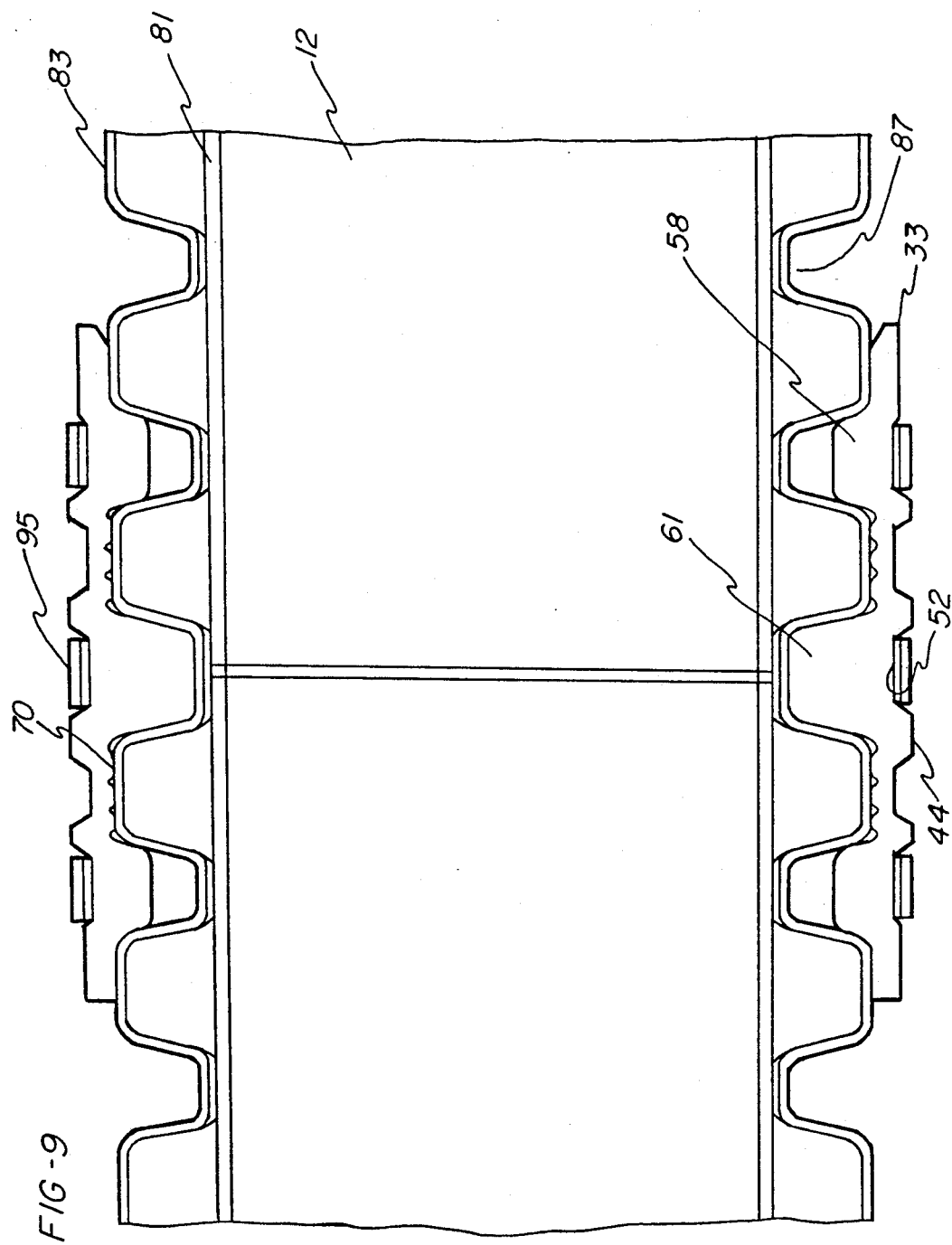
FIG. 9 is an alternative embodiment of the invention.

Actual utilization of the coupler of this invention in combination with double-wall plastic pipe is shown in FIGS. 7, 8 and 9. The presence of tapered end 33 makes it easier to slide the coupler onto the adjacent ends of pipe 12, while the flexible composition of the coupler permits it to be stretched slightly in order to insert the pipe into interior passage 34. The center rib 60 is positioned such that it is adjacent the opening between the pipe sections. As can be seen in FIGS. 7, 8 and 9, the pipe used in conjunction with the coupler has a smooth pipe inner wall 81, and a corrugated pipe outer wall 83 having formed therein pipe ribs 84 and pipe valleys 87. The adjacent sections of pipe have pipe ends 89 which, as mentioned above, are brought into adjacent relationship with center rib 60.

Just as center rib 60 is positioned between the pipe ribs 85 adjacent pipe ends 89, the other interiorly depending ribs 58 are positioned within pipe valleys 87, such that each of the interiorly disposed ribs on the coupler extend into corresponding valleys on the pipe.

In the preferred embodiment of the invention, a clamping means such as a strap 95, of the type associated with prior art clamping means for split couplers, may be positioned such that the strap 95 lays within outer surface valleys 48. The straps may be metal or nylon. When the straps are tightened about the pipe 12, the clamping force causes the pipe ribs 85 to compress the pressure beads and form a tight seal between the coupler and the pipe. For example, with the coupler secured about adjacent pieces of pipe, but without the clamping means being in place, the invention can withstand up to 5 PSI of pressure within the pipe before any leakage occurs. With the clamping means in place, the performance can be raised to 10 to even 20 PSI. In the low pressure application range for which this invention is designed to be used, and for which it will find use in the most applications, 10 PSI is practically the performance level associated with the plastic pipe itself. Thus it can be appreciated that the coupler of this invention provides for an extremely secure seal. Additionally, since the plastic pipe use in conjunction with this invention tends to expand when it is subjected to internal pressure, this expansion actually increases the sealing associated with this invention.

FIG. 7 and FIG. 8 show the coupler prior to clamping in FIG. 7, and after clamping in FIG. 8. It will be appreciated that due to the coordinated meshing of the various ribs and valleys of the coupler, pipe and straps, the seal which is provided is essentially uniform such that it is not as adversely affected as prior art seals by the various pressures exerted on the pipe and coupler.

FIG. 9 discloses an alternative embodiment of the invention wherein the straps are oriented over those valleys on the outer surface of the coupler which correspond i.e. are adjacent, to the inner surface ribs 58 including center rib 60.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. A coupler for use with pipe, said coupler comprising a circumferentially continuous tubular structure, said structure having an inner and an outer surface, said inner surface having at least three interiorly depending ribs, said inner surface having at least two inner surface valleys formed therein, said inner surface valleys having pressure beads formed therein, which pressure beads depend interiorly form said inner surface, said tubular structure encircled with means for clamping said coupler more tightly to a pipe.

2. The couple according to claim 1 wherein said outer surface is corrugated, having formed therein a plurality of valleys.

3. The coupler according to claim 1 wherein said tubular structure is flexible.

4. The coupler according to claim 1 wherein said pressure beads are of unequal size.

5. The coupler according to claim 1 wherein said inner surface has three interiorly depending ribs, said three ribs having a central rib of a first size with the other two ribs being of a second size.

6. The coupler according to claim 1 wherein said outer surface is corrugated, having formed therein a plurality of outwardly projecting ribs.

7. The coupler according to claim 1 wherein said outer surface is corrugated, having formed therein a plurality of valleys, said means for clamping positioned to lay in said outer surface valleys.

8. In combination, adjacent pieces of corrugated, double-wall plastic pipe, said pipe having an outer wall, said outer wall having corrugations in it, said outer wall having radially projecting pipe ribs and pipe valleys formed therein, and a coupler for use with said pipe, said coupler comprising a circumferentially continuous tubular structure, said structure having an inner and outer surface, said inner surface having at least three interiorly depending ribs with an inner surface valley disposed between adjacent ribs, said pipe being directly adjacent one another and being attached to one another by said coupler, said interiorly depending ribs of said coupler oriented between said outer wall pipe ribs, said coupler having inner surface valleys formed between said interiorly depending ribs having pressure beads formed therein depending interiorly therefrom.

9. The combination according to claim 8 wherein said pressure beads are in contact with said outer wall pipe ribs.

10. The combination according to claim 8 wherein said tubular structure is encircled with means for clamping said coupler more tightly to said pipe.

11. The coupler according to claim 10 wherein said outer surface is corrugated, having formed therein a plurality of valleys, said means for clamping positioned to lay in said outer surface valleys.

12. The coupler according to claim 8 wherein said inner surface has three interiorly depending ribs, said three ribs having a central rib of a first size with the other two ribs being of a second size.

* * * * *